United States Patent
Bytheway et al.

(10) Patent No.: US 9,069,430 B2
(45) Date of Patent: Jun. 30, 2015

(54) FAIL SAFE DESIGN FOR A STYLUS THAT IS USED WITH A TOUCH SENSOR

(71) Applicant: CIRQUE CORPORATION, Salt Lake City, UT (US)

(72) Inventors: Jared G. Bytheway, Sandy, UT (US); Nate Coy, Roy, UT (US); Paul H. Glad, Taylorsville, UT (US); Brian Monson, Farmington, UT (US); Keith L. Paulsen, Centerville, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 14/105,748

(22) Filed: Dec. 13, 2013

(65) Prior Publication Data

US 2014/0168156 A1    Jun. 19, 2014

Related U.S. Application Data

(60) Provisional application No. 61/737,014, filed on Dec. 13, 2012.

(51) Int. Cl.
   *G06F 3/044* (2006.01)
(52) U.S. Cl.
   CPC ...................... *G06F 3/044* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 5,149,919 | A | * | 9/1992 | Greanias et al. ........... 178/18.02 |
| 5,250,929 | A | * | 10/1993 | Hoffman et al. .............. 715/823 |
| 5,589,856 | A | * | 12/1996 | Stein et al. ..................... 345/173 |
| 5,777,898 | A | * | 7/1998 | Teterwak ........................ 702/95 |
| 7,012,199 | B2 | * | 3/2006 | Fukuda ..................... 178/18.02 |
| 7,391,930 | B2 | * | 6/2008 | Shih et al. ..................... 382/289 |
| 7,477,242 | B2 | * | 1/2009 | Cross et al. ................... 345/179 |
| 8,228,539 | B2 | * | 7/2012 | Shinohara .................... 358/1.15 |

* cited by examiner

*Primary Examiner* — Van Chow
(74) *Attorney, Agent, or Firm* — Morriss O'Bryant Compagni, PC

(57) ABSTRACT

A system and method for enabling a stylus to be used with a touch sensor even after it has failed in an open mode or a closed mode, wherein the tethered stylus activates the inking function when the stylus is in contact with the touch sensor and deactivates the inking function when the stylus is lifted off the surface of the touch sensor when the switch is functioning properly, but when there is a failure of the switch in the open mode or the closed mode, enabling the tethered stylus to continue functioning by using a timer to activate the inking function when the tethered stylus is close enough to be detected by a touch sensor, and to deactivate the inking function when the tethered stylus is no longer detectable by the touch sensor.

12 Claims, 5 Drawing Sheets

FAIL SAFE DESIGN FOR A STYLUS THAT IS USED WITH A TOUCH SENSOR

BACKGROUND OF THE INVENTION

1. Field of the Invention

This invention relates generally to a tethered stylus that is used with a touch sensor. More specifically, the invention is a change to operation of the tethered stylus so that a hardware failure of the tethered stylus does not prevent use of the touch sensor.

2. Description of Related Art

There are several designs for capacitance sensitive touch sensors. It is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

The proliferation of portable electronic appliances such as tablet computers and smart phones has also created new problems with keeping these power hungry and portable devices charged. It would be an advantage to be able to provide new and more convenient means for charging portable electronic appliances that use rechargeable batteries.

BRIEF SUMMARY OF THE INVENTION

In a preferred embodiment, the present invention is a system and method for enabling a stylus to be used with a touch sensor even after it has failed in an open mode or a closed mode, wherein the tethered stylus activates the inking function when the stylus is in contact with the touch sensor and deactivates the inking function when the stylus is lifted off the surface of the touch sensor when the switch is functioning properly, but when there is a failure of the switch in the open mode or the closed mode, enabling the tethered stylus to continue functioning by using a timer to activate the inking function when the tethered stylus is close enough to be detected by a touch sensor, and to deactivate the inking function when the tethered stylus is no longer detectable by the touch sensor.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensor" throughout this document may be used interchangeably with "capacitive touch sensor", "touch panel", "touchpad" and "touch screen".

A touch sensor is provided for use as a means of data input to an electronic appliance such as a computer or some type of related computational device. Touch sensor circuitry receives input from electrodes of the touch sensor and provides information regarding objects that are touching or in proximity of the touch sensor. However, there may be unused inputs on the touch sensor circuitry. A tethered stylus may be coupled to an unused input of the touch sensor circuitry. Input signals from the tethered stylus are sent to the touch sensor circuitry that enable the position regarding the tethered stylus relative to the touch sensor to be determined. Other information may also be obtained from the touch sensor circuitry regarding the tethered stylus. Such information may include pressure, tilt and rotation of the tethered stylus.

Figure 1:
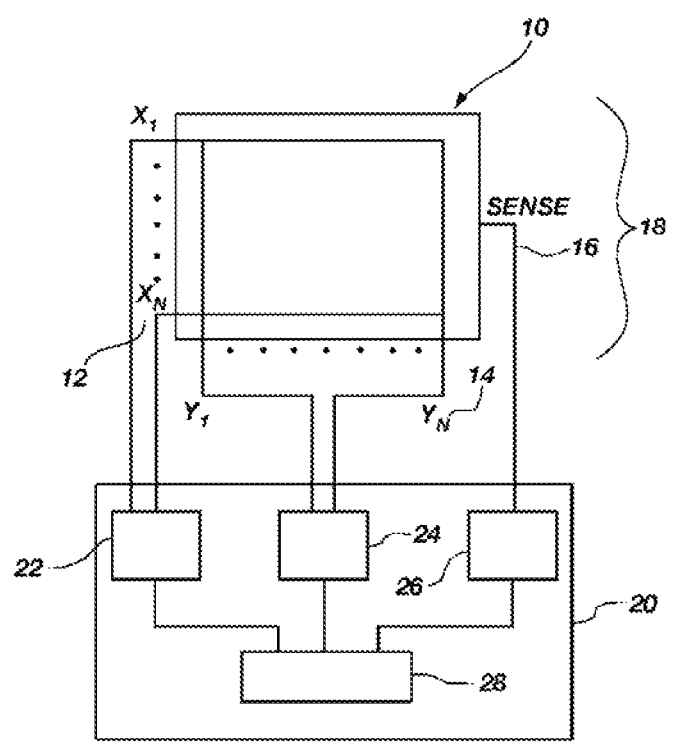
FIG. 1 is a block diagram of the components of a capacitance-sensitive touchpad as made by CIRQUE® Corporation and which can be operated in accordance with the principles of the present invention.
Figure 2:
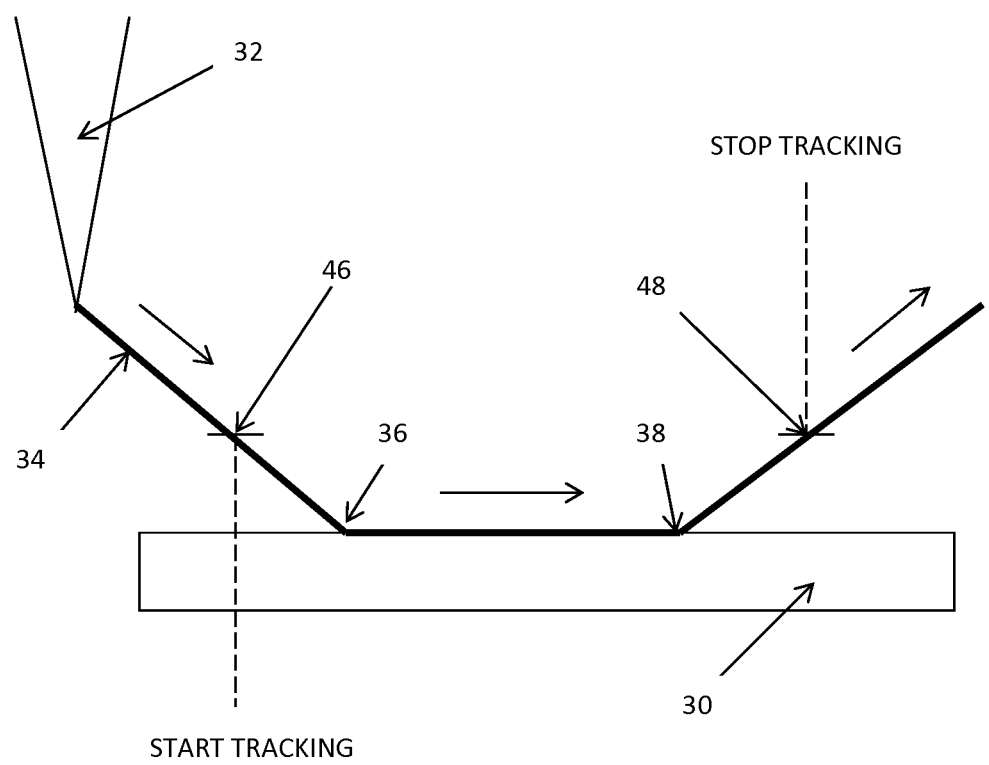
FIG. 2 is a block diagram that shows a touch sensor and a tethered stylus.

FIG. 2 is provided to illustrate how the first embodiment of the present invention may operate. Consider a touch sensor 30 and a tethered stylus 32. The path that may be followed by the tethered stylus 32 is shown as line 34. The tethered stylus 32 may approach the touch sensor 30 along the path 34. The tethered stylus 32 includes a switch. When the tethered stylus 32 makes contact with the touch sensor 30 at location 36, the tethered stylus 32 may begin inking or activate an inking function on an associated display screen that is showing input received from the tethered stylus 32 and the touchpad 30. After the tethered stylus 32 has traveled along the surface of the touch sensor 30, it may be lifted off the surface of the touch sensor 30 at point 38. At this time, the tethered stylus 32 may stop inking or deactivate the inking function on the display screen.

It is understood that the touch sensor 30 may be a touch screen, and thus the display is directly under or on top of the touch sensor. The touch sensor 30 may also be a touch panel or touchpad, and thus the display screen is separated from the touch panel or the touchpad.

Figure 3:
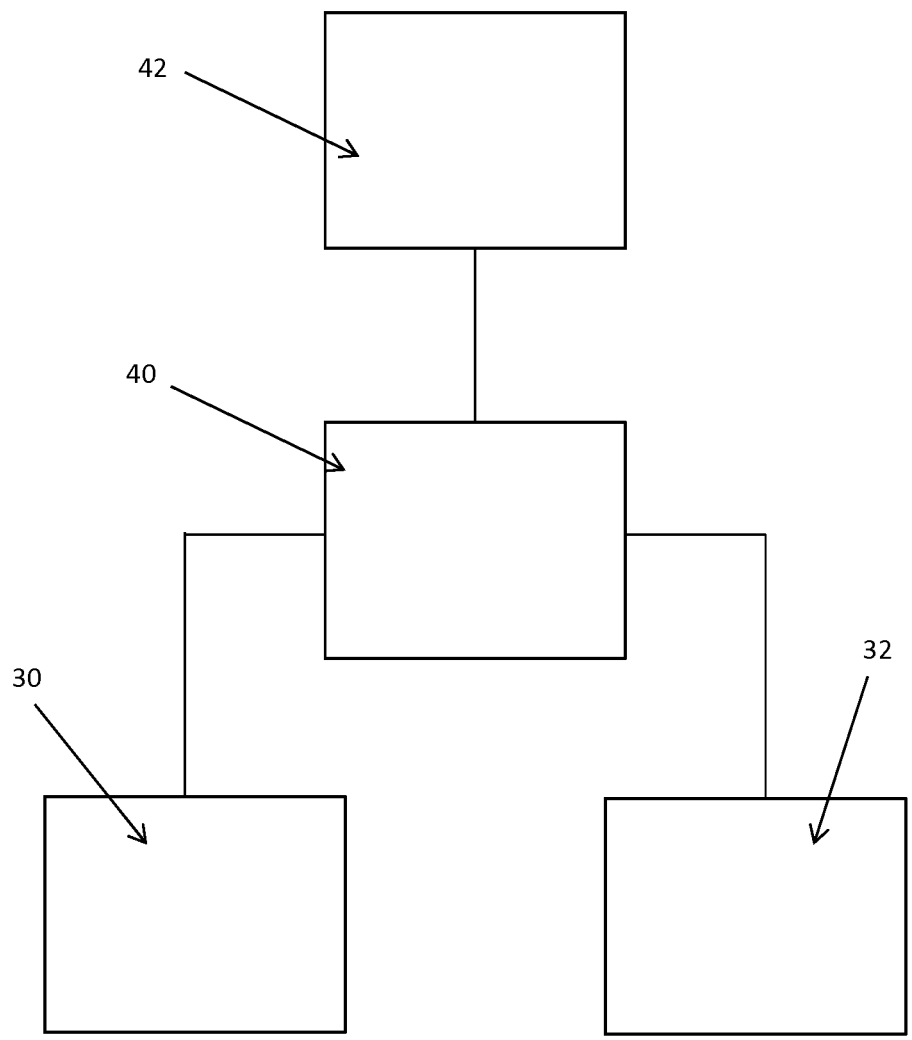
FIG. 3 is a block diagram that shows the relationship between the tethered stylus, a touch sensor, touch sensor circuitry and a display screen.

FIG. 3 shows in a block diagram that the touch sensor circuitry 40 receives input from the touch sensor 30 and the tethered stylus 32. The touch sensor circuitry 40 may send data to the display screen 42.

It was determined that there are two potential fail modes for the tethered stylus 32. These failure modes are failing open (fail open) and failing closed (fail closed). In other words, the switch in the tethered stylus 32 may fail where the switch is stuck in an open or a closed position. In a stuck open position, the tethered stylus 32 may not be able to send a signal to the touch sensor circuitry 40 indicating that the tethered stylus is on the touch sensor 30 and that inking should occur. In a stuck closed position, the tethered stylus 32 may not be able to send a signal to the touch sensor circuitry 40 indication that the tethered stylus is no longer on the touch sensor 30. This mode may interfere with operation of the touch sensor 30 because, for example, all contact may be ignored if it is not coming from the tethered stylus 32.

The different failure modes present potential problems to the system. In the fail open mode, the touch sensor 30 may not recognize the tethered stylus 32, and it may be impossible to perform inking. In the fail closed mode, the touch sensor 30 may believe that input may only be accepted from the tethered stylus 32, and thereby ignore all other touch data from the touch sensor, such as a finger moving on a surface of the touch sensor. The present invention may enable the tethered stylus 32 to perform inking regardless of which failure mode has occurred, and for the touch sensor 30 to accept touch input from an object other than the tethered stylus 32 when it is appropriate.

It should be understood that operation of the switch in the tethered stylus 32 is well known to those skilled in the art and is not considered to be a patentable aspect of the present invention. What is important to understand is that the switch can break, and the tethered stylus may continue to operate using the embodiments of the present invention.

The first embodiment teaches that the tethered stylus 32 may continue to operate by being able to bypass the failure of a faulty switch by providing the capability of tracking the tethered stylus using the touch sensor 30. In other words, the tethered stylus 32 must also be capable of being tracked by the touch sensor 30 in order for the first embodiment to function as desired.

Figure 4:
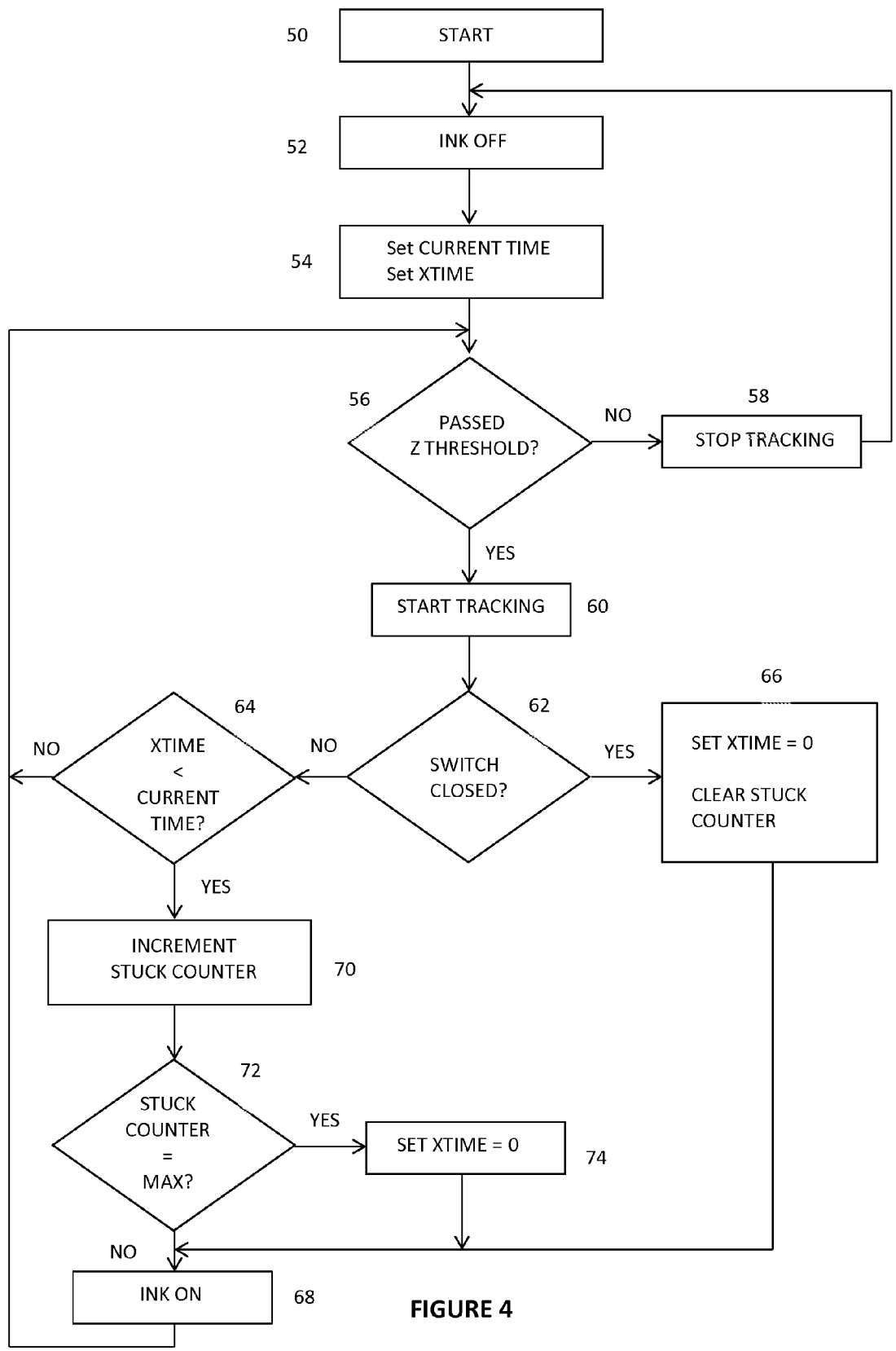
FIG. 4 is a flow chart that shows an algorithm that prevents a hardware failure of the tethered stylus from preventing operation of the touch sensor.

FIG. 4 is a flowchart that is provided to illustrate the first embodiment of the present invention. The algorithm begins at item 50. The first step at item 52 is to turning inking off to reset the system. In other words, the touch sensor circuitry 40 should send a command so that no inking should be taking place on a display screen 42.

The next step is to take a time stamp at item 54 and to add a predetermined amount of time to the current time and to store that value in the variable XTIME. The default value in the variable XTIME is zero. The purpose of this time stamp and the XTIME variable is not clear until addressing the issue of a fail open mode as will be explained.

The next step at item 56 is to check and see if the Z threshold 46 (the Z threshold depicting an approach of the tethered stylus towards the touch sensor 30) has been crossed by the tethered stylus 32 as shown in FIG. 2. The Z threshold 46 is not a set distance, and it may even vary for a particular tethered stylus 32 because of changes in the properties of the components being used. The Z threshold 46 is defined as the earliest detection of the tethered stylus 32 as it approaches the touch sensor 30. If the Z threshold 46 is not reached, then the algorithm stops tracking at item 58, and then returns to the step at item 52 where inking is turned off. The term Z threshold is used to reference the movement of the tethered stylus 32 in the Z axis, which is the axis away from the surface of the touch sensor 30.

In the event that the Z threshold 46 is reached and the tethered stylus 32 is detected by the touch sensor 30, then the algorithm proceeds to the next step where tracking begins in item 60. The step of tracking may not mean that inking begins, depending on the functionality of the tethered stylus 32.

As the tethered stylus 32 is likely to be descending towards the touch sensor 30, the next step is to determine if the inking switch (just "switch" hereinafter) on the tethered stylus 32 has been activated in item 62. The switch may be activated when the tip of the tethered stylus 32 not only makes contact with but physically presses against a spring loaded tip that completes a circuit in the switch in the tethered stylus 32. However, any means for activating the switch when the tethered stylus 32 makes contact with the touch sensor 30 is also considered to be within the scope of the present invention.

If the switch is not yet triggered, the algorithm proceeds to the step of checking to see if the variable XTIME is less than the current time in item 64. If this is analyzed from the perspective that the tethered stylus 32 is assumed to be functioning properly and the switch is working, it is unlikely that the value of the variable XTIME will be less than the current time. The assumption is being made that that the switch will be activated before XTIME is greater than the current time. It is assumed that the switch will be activated or closed, and that the algorithm will proceed from item 62 to item 66 instead of to 64. Thus, when the tethered stylus 32 makes contact with the touch sensor 30 at location 36 in FIG. 2, two events take place in item 66. Namely, the variable XTIME may be reset to a predetermined value such as zero, and the variable STUCK COUNTER is also cleared and may be set equal to zero.

The next step in item 68 may be to turn on inking. The position of the tethered stylus 32 is being tracked, and an inking trail may be shown on the display screen 42. The algorithm then returns to item 56. The algorithm will proceed through the steps in items 56, 60, 62, 66 and 68 and then back to item 56 as long as the switch on the tethered stylus 32 is activated. In other words, the tethered stylus 32 is in contact with the surface of the touchpad 30, causing the switch to be closed.

When the tethered stylus 32 is lifted off the touch sensor 30, and shown here by example as being at location 38, the switch is deactivated which means that the switch is now open. As the tethered stylus is pulled away from the touch sensor 30, it will eventually pass the Z threshold 48 which means that the tethered stylus 32 is no longer being detected. The algorithm will then proceed through the steps in items 52, 54 56, 58 and back to item 52. This loop continues until the Z threshold is crossed again when the tethered stylus 32 is again made to approach the touch sensor 30 to perform inking.

So far, the algorithm has been directed to what takes place when the switch in the tethered stylus 32 is functioning properly. However, it should be recognized that if the switch is stuck in a closed position, or it is in a fail closed mode, the Z threshold step in item 56 now controls operation of inking for the tethered stylus 32. In other words, the tethered stylus 32 is sending a signal indicating that it is in contact with the touch sensor 30 and that inking should commence as soon as the inking function is activated.

Looking at FIG. 2, it can be seen that the tethered stylus 32 would now begin inking earlier than touchdown at location 36, and continue inking after lift-off at location 38. Inking would now be controlled by passing the Z threshold 46.

The other failure mode of the tethered stylus 32 is when the switch is stuck open. When the tethered stylus 32 pressed down on the touch sensor 30 but the switch is broken and does not close, the algorithm follows a path that still allows inking.

When the Z threshold 46 from FIG. 2 is passed in item 56 (FIG. 3), the tethered stylus 32 is waiting for the switch to close before inking. If the switch is never closed because it is broken, the algorithm is able to compensate. In this embodiment, the algorithm only waits a set period of time before the system turns inking on based on the assumption that the tethered stylus was going to make contact with the touch sensor 30 because it was headed in that direction. This set period of time is going to be the value stored in the variable XTIME. Experimentation may be used to adjust the timing, but for the purposes of this example, it will be assumed that a value of 50 milliseconds accurately describes the amount of time that the tethered stylus might take to move from the Z threshold 46 to location 36 on the touch sensor 30.

In step 54, a start time is recorded. In other words, a time stamp is taken, and at the same time, the variable XTIME is set to be equal to the current time plus a set period of time. For example, it may be determined that if the switch has not closed 50 milliseconds after the Z threshold 46 has been crossed, the tethered stylus 32 should activate inking, even if the switch has not been closed or activated.

The assumption is made that this is the likely intent of the user, and if the switch is stuck open, then inking begins. Therefore, in item 54, the time stamp is recorded, a value is added to that time stamp, such as 50 ms, and this value is recorded as the variable XTIME.

Thus, as the algorithm repeats the steps in items 56, 60, 62, 64 and back to 56, this cycle will be repeated as many times as it takes until XTIME is not less than the current time. When item 64 is true and XTIME is less than the current time, the algorithm proceeds to item 70 where the variable STUCK COUNTER is incremented. The next step in item 72 is to determine if the variable STUCK COUNTER is at a maximum value. This maximum value is the number of times that the algorithm will see an open switch and increment the stuck counter. If the value MAX is set to the number 5, then the steps 56, 60, 62, 64, 70, 72 and 68 will be repeated 5 times. After being repeated 5 times, then the STUCK COUNTER now equals 5, and the algorithm proceeds from the step in item 72 to the step in item 74. In item 74, the variable XTIME is set equal to zero or some set period of time, and then proceeds to the step in item 68.

The result is that as long as the Z threshold is not passed again, the tethered stylus 32 will continue to ink, but the algorithm will now be repeating the cycle of the steps in items 56, 60, 62, 64 and back to 56 because XTIME was set equal to zero. Because the variable XTIME will always be less than the current time, the tethered stylus 32 will continue to ink until the Z threshold is passed in item 56, and the system will stop tracking and stop inking.

It should be understood that the present invention is not limited to the exact algorithm as shown in FIG. 4. What should be understood is that the present invention is the use of a tethered stylus that can be tracked by a touch sensor. This ability to be tracked enables the tethered stylus to enable the system to continue inking even if a switch on the tethered stylus has failed. Furthermore, the failure can be in a fail open or a fail closed mode.

If the tethered stylus fails in a fail closed or activated mode, then the operation of the tethered stylus is controlled by the ability to be tracked. There may be a slight delay in turning inking on or off, or there may even be a premature activation of the inking mode, but the tethered stylus will continue to operate.

However, when the tethered stylus has a switch that is stuck open, a slight delay is created before inking is turned on after the tethered stylus is close enough to the touch sensor to pass the Z threshold. But as long as the tethered stylus is not pulled away from the touch sensor far enough to pass the Z threshold 48, then inking will continue uninterrupted.

Figure 5:
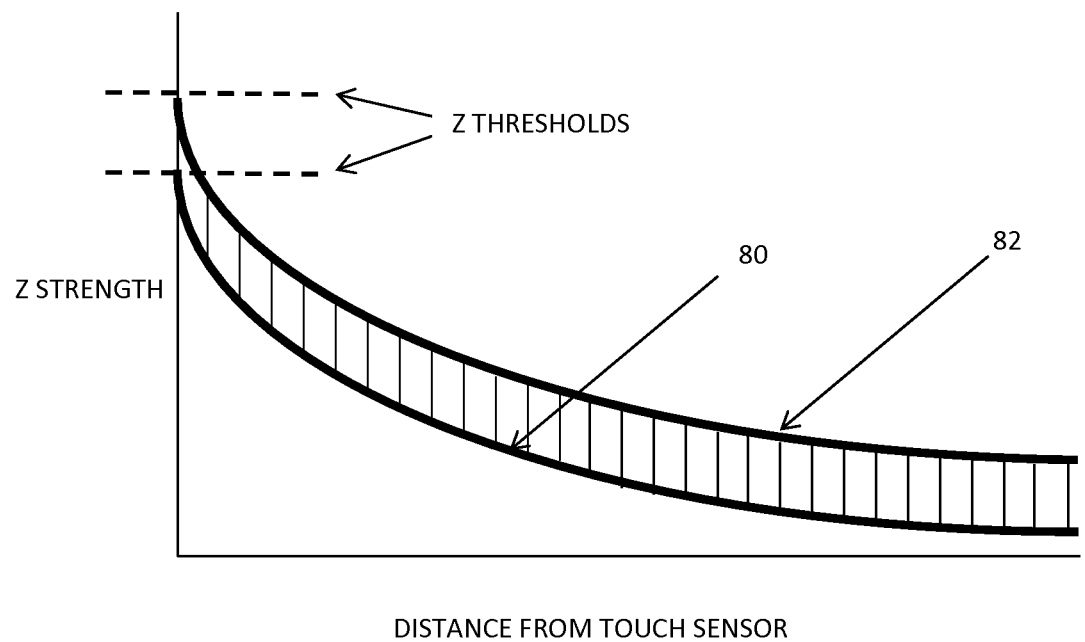
FIG. 5 is a graph showing a range of Z threshold values for different tethered styli.

FIG. 5 is a graph that shows how the Z level or Z strength of the tethered stylus 32 may vary as a function of distance of the tethered stylus from different touch sensors, 80 and 82. The reason for the variability in how far above the touch sensors 80, 82 that the tethered stylus 32 may be detected is a function of the capabilities of the touch sensors, the materials from which the tethered stylus is manufactured, and differences in the sensing capabilities of the touch sensor circuitry. This figure illustrates that the Z threshold when the tethered stylus 32 is detectable will simply vary, but not change the outcome of the algorithm of FIG. 4.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for enabling a tethered stylus to activate an inking function even if an inking switch has failed in an open mode or a closed mode, said method comprising:
   1) providing a touch sensor and a tethered stylus that is detectable by the touch sensor;
   2) providing touch sensor circuitry that receives input from the touch sensor and the tethered stylus and that determines a position of the tethered stylus in proximity of or in contact with the touch sensor;
   3) providing an inking switch in the tethered stylus that can activate or deactivate an inking function;
   4) activating the inking function when the inking switch is closed when the tethered stylus makes contact with the touch sensor, and deactivating the inking function when the tethered stylus is lifted off the touch sensor and the inking switch is opened; and
   5) activating the inking function when the inking switch has failed by detecting when the tethered stylus has closed to within a Z threshold of the touch sensor, and deactivating the inking function when the tethered stylus has moved beyond the Z threshold.

2. The method as defined in claim 1 wherein the method further comprises using two different algorithms to determine if the inking function should be activated when the inking switch has failed open and failed closed.

3. The method as defined in claim 2 wherein the method further comprises performing the following steps when beginning an inking function algorithm:
   1) deactivating the inking function; and
   2) recording a current time, adding a predetermined amount of time to the current time to make a new time and storing the new time in a variable XTIME.

4. The method as defined in claim 3 wherein the method further comprises using the following algorithm when the inking switch is functioning correctly:
   1) determining if the Z threshold has been reached;
   2) tracking the location of the tethered stylus if the Z threshold has been crossed;
   3) determining if the inking switch is closed or open; and
   4) activating the inking function if the inking switch has closed, or determining if the variable XTIME is less than the current time if the switch is still open, and then repeating steps 1 through 4 until the inking switch is closed, and then activating the inking function.

5. The method as defined in claim 4 wherein the method further comprises:
   1) setting a variable XTIME to zero each time the algorithm passes through steps 1 through 4 of claim 4; and
   2) setting a variable STUCK COUNTER to zero each time the algorithm passes through steps 1 through 4 of claim 4.

6. The method as defined in claim 3 wherein the method further comprises using the following algorithm when the inking switch may have failed closed:
   1) determining if the Z threshold has been reached;
   2) tracking the location of the tethered stylus if the Z threshold has been crossed;
   3) determining that the inking switch is closed;
   4) activating the inking function;
   5) repeating steps 1 through 4 until the tethered stylus has moved outside of the Z threshold, and then repeating the steps of claim 3.

7. The method as defined in claim 6 wherein the method further comprises:
   1) setting a variable XTIME to zero each time the algorithm passes through steps 1 through 4 of claim 4; and
   2) setting a variable STUCK COUNTER to zero each time the algorithm passes through steps 1 through 4 of claim 4.

8. The method as defined in step 3 wherein the method further comprises using the following algorithm when the inking switch may have failed open:
   1) determining if the Z threshold has been reached;
   2) tracking the location of the tethered stylus if the Z threshold has been crossed;
   3) determining that the inking switch is open;
   4) determining if the variable XTIME is less than the current time if the switch is still open, and repeating steps 1 through 4 until the variable XTIME is not less than the current time; and
   5) activating the inking function.

9. The method as defined in claim 8 wherein the method further comprises repeating step 1 through 4 of claim 8 a predetermined number of times equal to a value MAX.

10. The method as defined in claim 9 wherein the method further comprises setting the variable XTIME equal to zero after steps through 4 of claim 8 are repeated MAX times.

11. The method as defined in claim 10 wherein the method further comprises performing the inking function until the tethered stylus moves beyond the Z threshold.

12. A system for enabling a tethered stylus to activate an inking function even if an inking switch has failed in an open mode or a closed mode, said system comprised of:
   a touch sensor;
   a tethered stylus that is detectable by the touch sensor;
   touch sensor circuitry that receives input from the touch sensor and the tethered stylus and that determines a position of the tethered stylus in proximity of or in contact with the touch sensor;
   an inking switch in the tethered stylus that can activate or deactivate an inking function, wherein the inking function is activated when the inking switch is closed when the tethered stylus makes contact with the touch sensor, and wherein the inking function is deactivated when the tethered stylus is lifted off the touch sensor and the inking switch is opened, and wherein the inking function is activated when the inking switch has failed by detecting when the tethered stylus has closed to within a Z threshold of the touch sensor, and wherein the inking function is deactivated when the tethered stylus has moved beyond the Z threshold.

* * * * *